United States Patent
Nyfelt

(10) Patent No.: US 6,167,793 B1
(45) Date of Patent: Jan. 2, 2001

(54) SYSTEM FOR LOCALIZING AND IDENTIFYING MINES

(75) Inventor: Leif Nyfelt, Skovde (SE)

(73) Assignee: New Swede Construction AB, Skovde (SE)

( * ) Notice: Under 35 U.S.C. 154(b), the term of this patent shall be extended for 0 days.

(21) Appl. No.: 09/101,991

(22) PCT Filed: Jan. 21, 1997

(86) PCT No.: PCT/SE97/00090

§ 371 Date: Aug. 13, 1998

§ 102(e) Date: Aug. 13, 1998

(87) PCT Pub. No.: WO97/27445

PCT Pub. Date: Jul. 31, 1997

(30) Foreign Application Priority Data

Jan. 22, 1996 (SE) .................................................... 9600224

(51) Int. Cl.[7] .................................................... G01V 3/15
(52) U.S. Cl. .......................................... 89/1.13; 102/402
(58) Field of Search ........................... 89/1.13; 102/402, 102/403, 217

(56) References Cited

U.S. PATENT DOCUMENTS

| | | | |
|---|---|---|---|
| 2,504,118 | * 4/1950 | Evans | 102/402 |
| 3,027,837 | * 4/1962 | Kendall | 102/402 |
| 4,021,725 | 5/1977 | Kirkland | 89/1.13 |
| 4,390,880 | 6/1983 | Henoch | 343/6.82 C |
| 5,214,236 | * 5/1993 | Murphy et al. | 102/217 |
| 5,307,272 | 4/1994 | Butler et al. | 102/402 |
| 5,452,639 | 9/1995 | Aulenbacher et al. | 89/1.13 |

FOREIGN PATENT DOCUMENTS

| | | | |
|---|---|---|---|
| 3219488 | * 12/1983 | (DE) | 89/1.13 |
| 3432847 A1 | 3/1986 | (DE) . | |
| 3526492 A1 | 1/1987 | (DE) . | |
| 4126381 A1 | 2/1993 | (DE) . | |
| WO 96/23236 | 8/1996 | (WO) . | |

OTHER PUBLICATIONS

Popular Science; Clearing a Path; p. 56; 89/1.13, Sep. 1943.*

* cited by examiner

*Primary Examiner*—Stephen M. Johnson
(74) *Attorney, Agent, or Firm*—Young & Thompson

(57) ABSTRACT

A mine localizing and identifying system. Each mine is equipped with a signalling device adapted to transmit a specific signal in response to receiving a specific activating signal. The system includes a mine-clearing tool that is adapted to transmit the specific activating signal and to receive the specific signal from the signalling device, and includes a direction-finding device for localizing the mine with the aid of the signal transmitted from the mine.

5 Claims, 1 Drawing Sheet

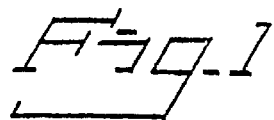
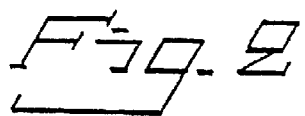
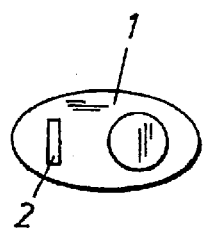
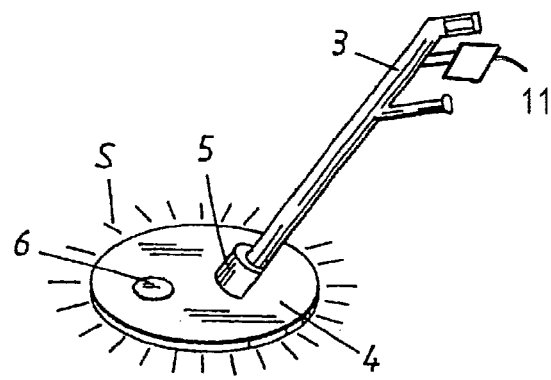
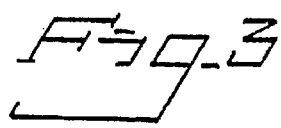
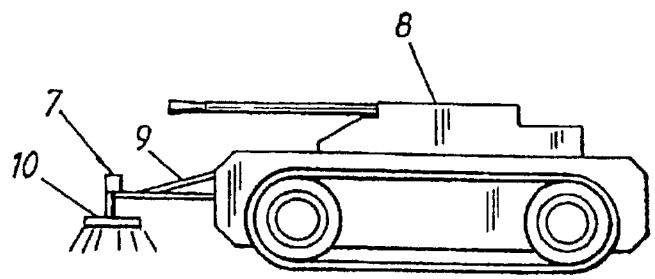
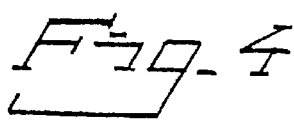
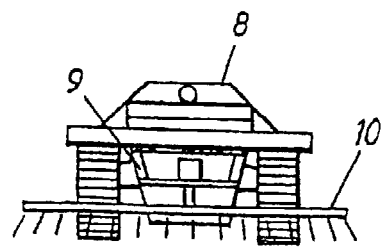

SYSTEM FOR LOCALIZING AND IDENTIFYING MINES

FIELD OF THE INVENTION

The present invention relates to a system for localizing and identifying mines.

BACKGROUND OF THE INVENTION

Mines are an effective weapon for preventing and delaying the movements of ground troops and from two to five million mines are laid each year worldwide. One problem with mine fields is that the mines also present an obstacle to one's own troops and to the civilian population. Another problem is presented when the mines are to be cleared away and removed. This task is time-consuming, dangerous and expensive, because there is no simple manner in which the mines can be localized.

SUMMARY OF THE INVENTION

The object of the present invention is to solve these problems without jeopardizing the defensive function of mines in wartime conditions.

This object is achieved in accordance with the invention by means of a mine localizing and identifying system which is characterized in that each mine is equipped with signalling means adapted to transmit a specific signal in response to receiving a specific activating signal, and is further characterized by a mine-clearing tool that is adapted to transmit said specific activating signal and to receive the specific signal emitted by the signalling means and that includes a direction-finding device which functions to localize the mine with the aid of the signal transmitted from the mine. The enemy can be prevented from finding mines, by limiting access to the specific activating signal in wartime while providing access to said specific activating signal in times of peace so as to enable individual mines to be readily removed.

In one preferred embodiment of the invention, the specific activating signal is a coded signal and the mine-clearing tool includes means for indicating the reception of a signal transmitted by a mine. The specific signal transmitted by the signalling device also includes information relating to mine identity, the type of mine concerned and to the unit to which the mine belongs and the mine-clearing tool includes means for storing information relating to localized mines. This information may then be transferred to a memory register.

BRIEF DESCRIPTION OF THE DRAWING

The invention will now be described with reference to the accompanying drawings, in which FIG. 1 illustrates schematically and from above a mine that is included in one embodiment of an inventive system;

FIG. 2 illustrates schematically and in perspective a mineclearing tool according to one embodiment of the invention; and FIGS. 3 and 4 are respective schematic side and front views of a tank equipped with a second embodiment of a mine-clearing tool.

FIG. 1 illustrates very schematically a mine 1 provided with a passive transponder or a passive chip 2, which is adapted to transmit a signal in response to receiving an activating signal in the form of a coded radio signal. The chip 2 may either be moulded in the mine or fastened to its casing in some suitable manner, for instance glued thereto.

FIG. 2 illustrates schematically a portable mine-clearing tool 3 equipped with an antenna 4. The tool 3 also includes a transmitter/receiver unit 5 which is adapted to transmit a coded signal S and to receive each signal transmitted by a mine 1 located within range of the signal S. The tool 3 also includes a device 6 for indicating the reception of a mine signal and also the intensity of this signal. A mine can thus be localized, by moving the tool 3 in a direction in which the intensity of the received signal increases. The device 6 that indicates reception of the mine transmitted signal may either be light-emitting or sound-emitting.

In one variant, in addition to containing information relating to the identity of the mine the signal emitted by the chip 2 on the mine 1 may also indicate the type of mine concerned and the army division or unit that laid the mine. The mine-clearing tool may include a display on which this information can be presented. The information may also be stored in a microprocessor or some like device and transmitted to a mine register in some suitable manner, subsequent to clearing the mine or the mine field.

FIGS. 3 and 4 illustrate a second embodiment of a mine-clearing tool 7 that is mounted on the front end of a vehicle, in the illustrated case a tank 8, through the medium of an adjustable frame structure 9. In principle, the sole difference between the tool 7 from the portable tool 3 illustrated in FIG. 2 is that the tool 7 has an elongated antenna 10 which is operable in sweeping wider areas than can be achieved with the tool 3 of the FIG. 1 embodiment, which scans a very limited area laterally. In one preferred variant of the FIG. 3 embodiment, the electronics of the tool 7 are connected to the vehicle brake system, such that the vehicle will be braked when the tool receives a response signal from a mine.

When laying mines, the identity and position of each mine can be programmed with the aid of a GPS navigator. When mines are to be cleared, this information, contained on lists or the like, can be readily taken-out and the mines "ticked-off" as they are cleared.

It is also conceivable solely to determine the positions of the mine with the aid of the GPS navigator.

Thus, the present invention provides a mine localizing and identifying system that enables laid mines to be readily discovered by persons that have access to a given code signal, but inhibits the detection of mines by others. Thus, the system enables one's own mines to be readily localized and quickly cleared in times of war, thereby enabling troops to pass through their own mine fields, for instance when retreating. The code can also be given to others in times of peace, thereby enabling mines to be safely cleared. By registering at least the identity of mines that have been laid, it is possible to establish whether or not all mines have been cleared in a mine-clearing operation.

In one variant of the invention, the chip may be adapted for activation by a signal of specific frequency, this signal being uncoded in other respects. Such a signal can easily be revealed for what it is, and in such applications a number of "dummy mines" in the form of individual chips may be laid in order to confuse the enemy. In such cases, it is necessary that the mineclearing tool is able to disclose the identity of the chip so that one's own troops will be able to decide whether or not the mine signal denotes a live mine or a dummy mine.

For training purposes or troop exercising purposes, the aforedescribed equipment can be modified for use in indicating when a soldier treads on a practice mine. For instance, the chip may be fastened to the boot laces of each soldier of a particular military unit or troop, and a detector that includes a transceiver unit may be placed on a practice mine. When a soldier passes such a practice mine, the identity of the chip will be evident from its response signal, therewith identifying the soldier in question. The detector unit placed in the practice mine will also suitably include a clock with which the time at which the soldier passed over the practice mine can be registered. The signal transmitted by the chip may also contain information concerning the unit to which the soldier belongs and other information desirable in this context. The detector unit in the practice mine suitably includes a memory for storing received information, and an output by means of which the practice mine can be connected at the end of an exercise to equipment suitable for transferring the stored information. Such practice mines will enable it to be subsequently established whether one's own unit or some other unit has passed through the mine field, and also the time at which this took place. Naturally, military training vehicles may also be provided with such chips for the same purpose.

It will be understood that the aforedescribed embodiments can be modified in many ways within the scope of the invention. For instance, a mine-clearing tool can be made an integral part of a soldiers equipment with antennas mounted directly in the soles of the boots of foot-soldiers and mini-indicators mounted in an ear clip for instance, therewith simplifying a retreat manoeuvre. The chip can also be designed for remote programming by radio signals. The direction finding equipment may also be of another kind. The invention is therefore restricted solely by the contents of the following Claims.

What is claimed is:

1. A system for localizing and identifying mines, each mine being provided with a signalling device structured and arranged to transmit a specific signal when receiving a specific activating signal, the system comprising a mine-clearing tool having means for transmitting said specific activating signal and for receiving said specific signal transmitted by the signalling device; and direction finding equipment operable to localize said mine with the aid of the signal transmitted from the mine.

2. The system according to claim 1, wherein the specific activating signal is a coded signal.

3. The system according to claim 1, wherein the mine-clearing tool includes means for indicating the reception of the signal transmitted from the mine.

4. The system according to claim 3, wherein the specific signal from the signalling device also includes information related to the type of mine concerned and also to a military unit to which the mine belongs.

5. The system according to claim 1, wherein the mine-clearing tool includes means for storing information related to localized mines.

* * * * *